United States Patent [19]

Ogawa

[11] Patent Number: 4,980,588
[45] Date of Patent: Dec. 25, 1990

[54] WATER-COOLED VEHICLE GENERATOR

[75] Inventor: Hitoshi Ogawa, Himeji, Japan

[73] Assignee: Mitsubishi Denki Kabushiki Kaisha, Tokyo, Japan

[21] Appl. No.: 7,238

[22] Filed: Jan. 27, 1987

[30] Foreign Application Priority Data

Feb. 14, 1986 [JP] Japan ................... 61-31308
Feb. 14, 1986 [JP] Japan ................... 61-31309

[51] Int. Cl.⁵ ............................................. H02K 9/19
[52] U.S. Cl. ........................ 370/68 D; 123/41.31; 310/54
[58] Field of Search ............ 123/41.31, 41.33, 195 A, 123/196 R, 198 R, 198 DA, 198 C; 310/54, 68 R, 68 D, 87

[56] References Cited

U.S. PATENT DOCUMENTS

| | | | |
|---|---|---|---|
| 2,414,532 | 1/1947 | Johns et al. | 310/89 |
| 3,363,123 | 1/1968 | Jaeschke | 310/54 |
| 4,221,982 | 9/1980 | Raver et al. | 310/68 D |
| 4,409,502 | 10/1983 | McCabria | 310/68 D |
| 4,739,204 | 4/1988 | Kitamura et al. | 310/68 D |
| 4,818,906 | 4/1989 | Kitamura et al. | 310/68 D |
| 4,922,148 | 4/1990 | Kitamura | 310/68 D |

FOREIGN PATENT DOCUMENTS

| | | | |
|---|---|---|---|
| 2407597 | 6/1979 | France | 310/63 |
| 59-83557 | 5/1984 | Japan | 310/68 D |
| 129692 | 1/1929 | Switzerland | 310/54 |

Primary Examiner—Steven L. Stephan
Assistant Examiner—D. L. Rebsch
Attorney, Agent, or Firm—Sughrue, Mion, Zinn, Macpeak and Seas

[57] ABSTRACT

A vehicle mounted generator includes fins 25 mounted on one end of the rotor 3 to function as a water pump within an outer shell 16, 17 of the generator to draw engine coolant water through the interior of the generator to cool components which generate large amounts of heat.

2 Claims, 3 Drawing Sheets

WATER-COOLED VEHICLE GENERATOR

BACKGROUND OF THE INVENTION

This invention relates to a vehicle mounted generator having an improved cooling system.

FIG. 1 shows an example of a conventional generator having a cooling system including a cooling fan, in which reference numerals 1, 2, 3, 3a, 3b, 3c and 3d depict a pulley, a rotor shaft coupled to the pulley, a rotor fixedly secured to the rotor shaft, teeth portions A, teeth portions B, a ring of a nonmagnetic material and a rotor core, respectively. A front bracket 4 and a rear bracket 5 rotatably support the shaft 2 via bearings 6 and 7. An exciting coil 8 is wound on a core 9 fixed to the rear bracket 5. A stator coil 10 is fixedly supported between the front and the rear brackets, and mounts a stator coil 10a. Reference numerals 11, 12 and 13 depict a rectifier, a voltage regulator and a fan, respectively, and the fan is fixed to the shaft 2 so that it can rotate therewith. The rear bracket 5 is formed with cooling air suction holes 14 in its side wall and the front bracket 4 is formed with cooling air discharge holes 15 in its side wall.

In operation, the pulley 1 is driven by a belt (not shown) of a vehicle engine (not shown). Therefore, the rotor shaft 2 and hence the rotor 3 fixedly secured thereto are rotated. The teeth portions 3a and 3b are induction members alternately magnetized in opposite polarities by the exciting coil 8, and are interleaved with each other so that when the rotor 3 rotates along the inner periphery of the stator core 10, an electromotive force is induced in the stator coil 10a. Since the electromotive force is alternating, it is rectified by the rectifier 11 and supplied to a battery and/or other electrical loads. The voltage regulator 12 functions to control the exciting current in the coil 8 so that the electromotive force induced in the stator coil 10a is maintained constant. When the fan 13 is rotated together with the pulley 1, air is drawn through the suction holes 14 to the interior of the brackets to cool the rectifier 11, the voltage regulator 12, the exciting coil 8, the stator core 10 and the stator coil 10a, etc., and then exits through the discharge holes 15.

It is generally understood that the cooling capacity of the fan of such a conventional generator mentioned is not sufficient. Therefore, it is impossible to increase the output current thereof due to increased temperature when the engine rotates at a low speed with a reduced amount of cooling air. Further, since the temperature of the air introduced through the suction holes 14 is usually high because it passes along the hot engine, it may increase the temperature of the electrical components, causing the output current to be reduced and requiring the use of some expensive materials for providing heat resistivity to these components.

In order to resolve this problem, it may be possible to make the size of the fan larger to thereby increase the flow rate of cooling air. This approach, however, produces other problems such as noise and the difficulty of mounting such a large fan on the generator.

In order to resolve all of the above mentioned problems, U.S. Pat. No. 4,295,067 proposes the use of a heat pipe instead of the fan. As is clearly shown in this U.S. Patent, the heat pipe is provided outside the brackets and adapted to cool components of the generator which generate large quantities of heat. The cooling efficiency of such a system is satisfactory. However, due to the use of the heat pipe arranged outside the brackets, the size of the generator becomes very large, necessarily causing a problem in mounting the generator in a limited space.

SUMMARY OF THE INVENTION

An object of the present invention is to provide a vehicle mounted generator having a cooling system for cooling parts inside the generator, which is compact in size and has an improve cooling capacity to allow the generator to increase its output power without noise. The cooling system utilizes water as a coolant circulating inside the generator, so that the parts housed in the generator can be inexpensive.

The generator according to the present invention features a water pump incorporated therein which is adapted to circulate engine coolant water within the generator.

DETAILED DESCRIPTION OF THE PREFERRED EMBODIMENTS

Figure 1:
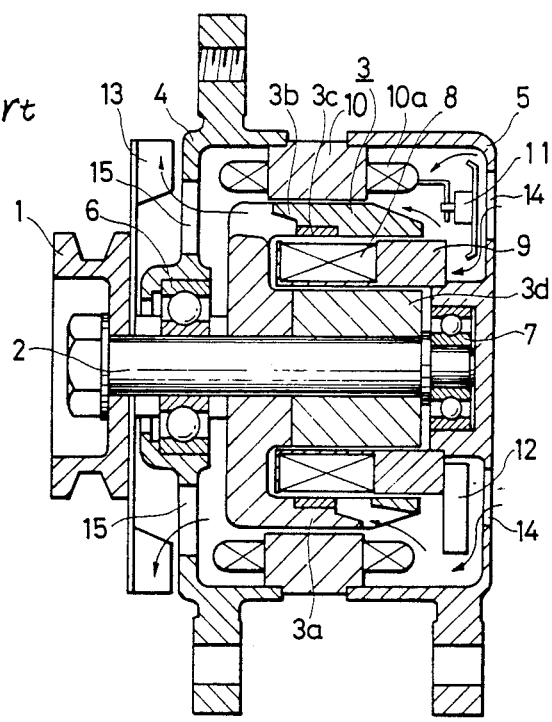
FIG. 1 is a cross section of a conventional generator.
Figure 2:
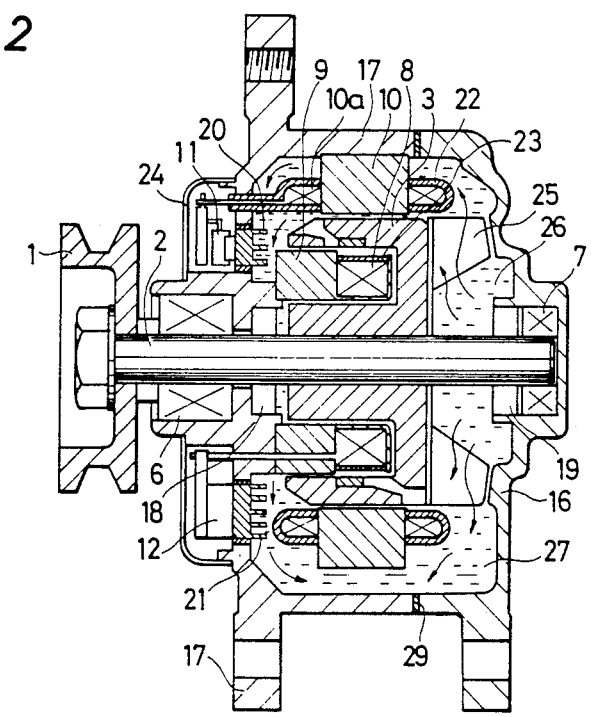
FIG. 2 is a cross section of an embodiment of the present invention.
Figure 3:
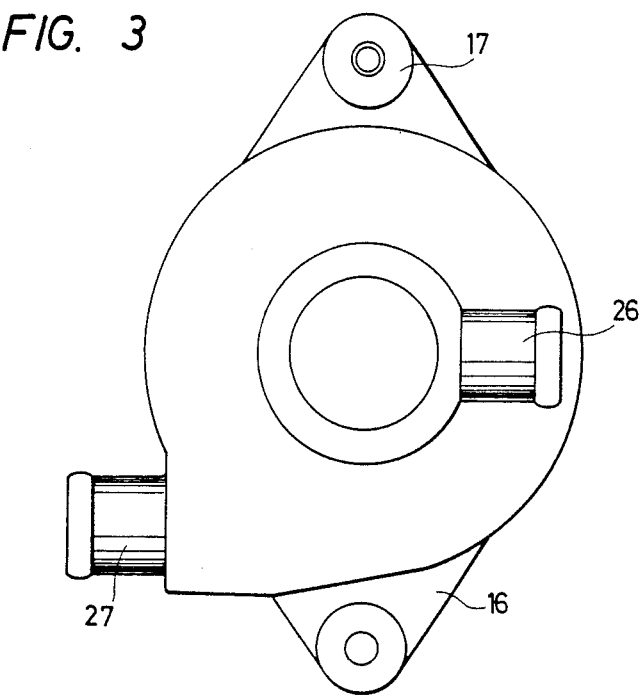
FIG. 3 is a rear view of the generator shown in FIG. 2.

In FIGS. 2 and 3, a rear bracket 16 and a front bracket 17 constitute a shell of the generator when assembled together through a packing 29. The brackets 16 and 17 support a rotor shaft 2 via bearings 6 and 7. In order to prevent the leakage of coolant to the bearings 6 and 7, sealing members 18 and 19 are fixedly secured to the rotor shaft 2 as shown. Fins 20 and 21 are fixedly secured to the front bracket 17 to radiate heat and thereby cool the rectifier 11 and the voltage regulator 12. The stator coil 10a and the exciting coil 8 are coated with anti-corrosive coatings 22 and 23 of anti-corrosive resin material, respectively. A cover member 24 is fixed to the bracket 17 to protect the rectifier 11 and the voltage regulator 12. A water pump is constituted by fins 25, an intake opening 26 is provided in the rear bracket 16 and a discharge opening 27 is also provided in the bracket 16. The intake opening 26 is connected to the radiator of a vehicle engine on which the generator is mounted, and the discharge opening 27 is connected to the cooling system of the engine. In these figures, arrows show the flow directions of the coolant water within the brackets 16 and 17.

In operation, when the pulley 1 is rotated, the generator starts to generate electrical power in a conventional manner. At the same time, the fins 25 of the water pump are rotated to draw the coolant water from the engine radiator through the intake opening 26. The coolant water cools the stator coil 10a and the exciting coil 8 housed in the brackets directly, and the rectifier 11 and the voltage regulator 12 indirectly through the radiator fins 20 and 21, and is then discharged through the discharge opening 27 to the cooling system of the engine. Since the cooling water is neither compressed nor expanded as compared with air, the amount of the coolant water taken in the generator is proportional to the amount of heat radiated, and thus the cooling efficiency is much improved over a conventional air cooled generator.

In the conventional generator, hot air at around 100° C. in the engine compartment of the vehicle is used as the coolant for the generator. However, in the present generator, the coolant water is cooled to about 70° C. or lower by the engine radiator. Therefore, it is possible to dissipate heat generated by the stator coil, the exciting coil, the rectifier and the voltage regulator more efficiently.

Therefore, it is possible to minimize the generator size and/or to increase the output power of the generator even at low engine rpms.

Further, in the present generator, the rotation of the fins 25 of the water pump does not produce any noise. Therefore, it is possible to use larger fins in order to further improve the cooling effect.

Figure 4:
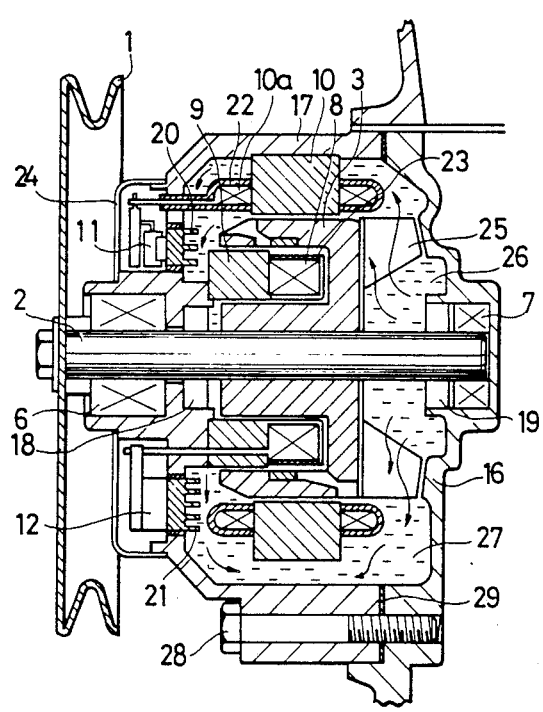
FIG. 4 is a cross section of another embodiment of the invention.
Figure 5:
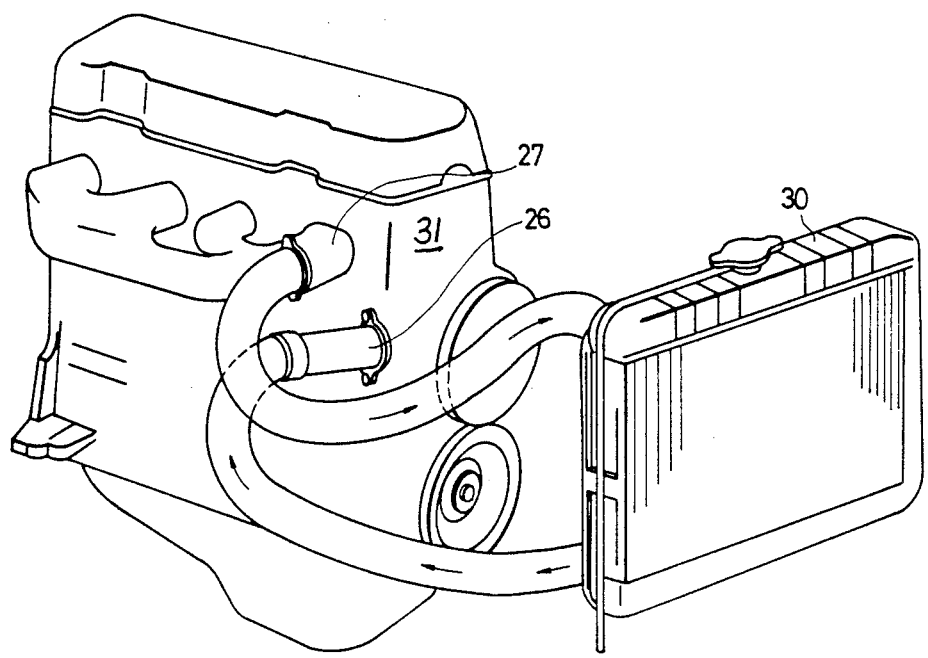
FIG. 5 is a perspective view of an engine block incorporating the generator and associated with a radiator.

FIG. 4 shows another embodiment of the invention, and FIG. 5 is a schematic perspective view of a radiator and an engine of a vehicle in which the generator is incorporated.

In FIG. 4, the general construction of the generator is the same as that of the embodiment shown in FIG. 2. A difference, however, is that in FIG. 4 the rear bracket 16 is formed as a portion of the engine block. That is, the generator in FIG. 4 is incorporated in the engine block 31 as shown in FIG. 5, and the intake opening 26 and the discharge opening 27 of the generator are connected to the discharge port and the intake port of the engine radiator 30, respectively. In FIG. 4, a bolt 28 secures the front bracket 17 to the engine block embodying the rear bracket 16.

What is claimed is:

1. A vehicle mounted generator, comprising: a shaft (2) rotatably supported by bracket means (16, 17); a rotor (3) fixedly secured to said shaft; an exciting coil (8) mounted proximate said rotor; a stator (10) having a stator coil (10a) arranged peripherally thereof such that an alternating electromotive force is induced therein when said rotor is magnetized by said exciting coil and rotated; and rectifier (11) for rectifying the alternating electromotive force induced in said stator coil; a voltage regulator (12) for regulating the rectified electromotive force to a constant value; at least said rotor, said exciting coil and said stator being housed in said bracket means; said bracket means being formed with a water intake opening (26) and a water discharge opening (27); and cooling means for introducing engine coolant water of said vehicle through said water intake opening into an interior of said bracket means, and for discharging said engine coolant water through said discharge opening such that at least said rotor, said exciting coil, said stator, and said stator coil are cooled by the engine coolant water, said cooling means comprising an external radiator (30) for radiating heat absorbed by the engine coolant water, and a water pump for circulating the coolant water from said radiator through said bracket means to an engine (31) of said vehicle, wherein:

(a) the bracket means defines a water jacket enclosing the rotor and stator, (b) the rectifier and voltage regulator are individually mounted exteriorly of said water jacket on heat sinks (20,21) having cooling fins extending into the jacket, and (c) the cooling means includes a plurality of fins (25) spaced around a lateral circumference of the rotor and extending axially outwardly therefrom to define, in cooperation with an adjacent portion of said jacket, a centrifugal water pump.

2. The vehicle mounted generator as claimed in claim 1, wherein said bracket means is fixedly secured to an engine block of said vehicle and said shaft is driven by said engine.

* * * * *